UNITED STATES PATENT OFFICE.

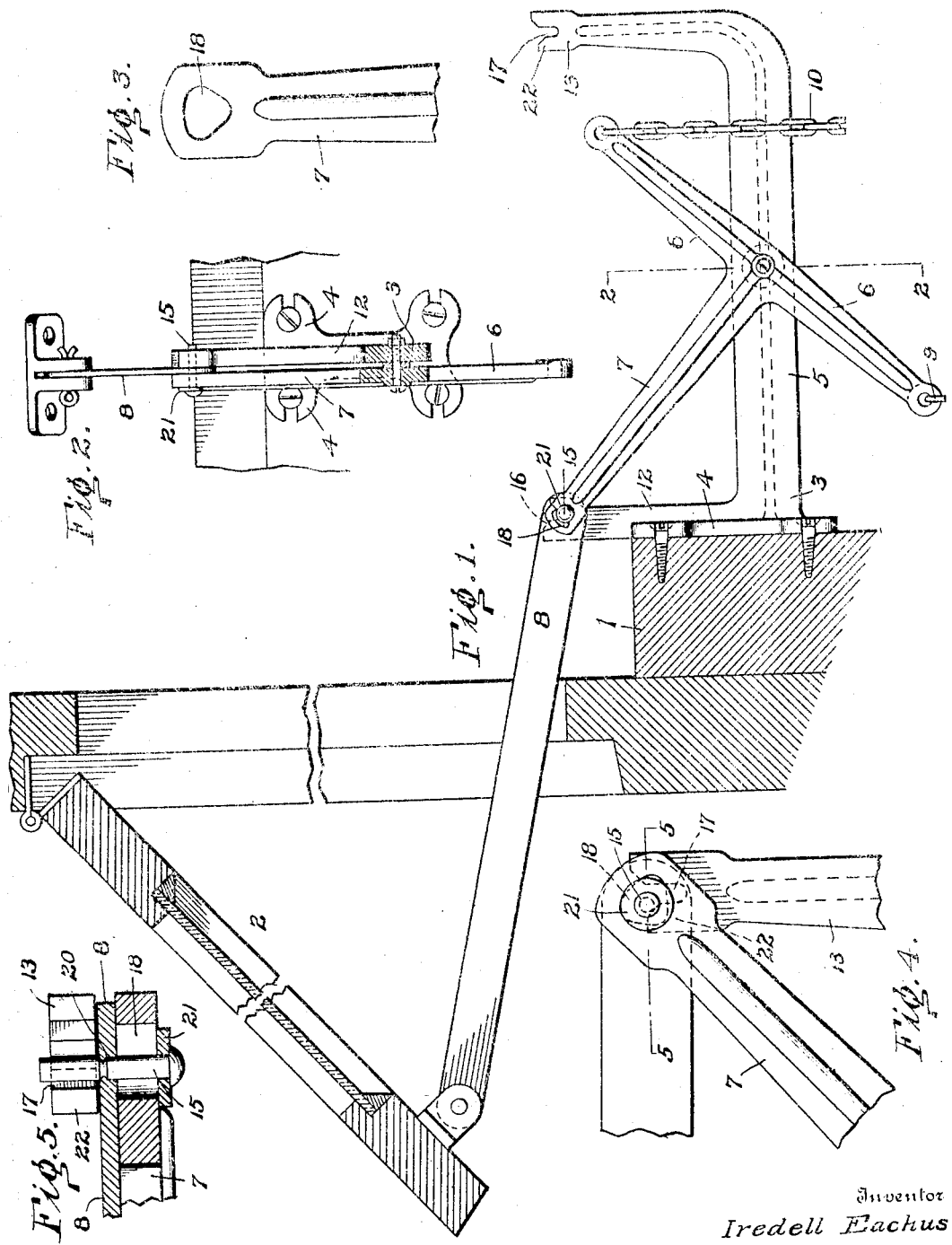

IREDELL EACHUS, OF PHILADELPHIA, PENNSYLVANIA.

DEVICE FOR OPERATING VENTILATORS.

No. 876,338.     Specification of Letters Patent.     Patented Jan. 14, 1908.

Application filed January 31, 1907. Serial No. 354,984.

*To all whom it may concern:*

Be it known that I, IREDELL EACHUS, a citizen of the United States, residing at Philadelphia, in the county of Philadelphia and State of Pennsylvania, have invented certain new and useful Improvements in a Device for Operating Ventilators, of which the following is a specification.

My invention relates to improvements in a device for operating ventilators or the like having swinging sash or panels.

The object of my invention is to provide a means for readily operating the sash and for automatically locking the same in either an opened or closed position; a further object of my invention is to produce an operating device which is simple in construction and which can be manufactured at a very low cost.

Referring to the drawings:—Figure 1. is a side elevation of my improved locking device attached to a ventilator, which latter is shown in section; Fig. 2. is a sectional view on line 2—2 Fig. 1; Fig. 3. is an enlarged detail view of a portion of the locking arm; Fig. 4. is an enlarged side elevation of a portion of the locking arm and adjuncts, illustrating the manner of locking the same; Fig. 5. is a horizontal section on line 5—5 Fig. 4.

In the drawing 1 represents a window frame; 2 a swinging sash hinged to the window frame. A bracket 3 is secured to the inside of the window frame. Said bracket consists of the plate 4 for fastening it and an arm 5 projecting from said plate forming a bearing in which is pivoted a lever 6 having a locking arm 7 extending at right angles to the same. A connecting rod 8 is pivotally attached to the free end of the locking arm 7 and to the swinging sash 2, so that the latter may be opened or closed by operating the lever 6 by means of the chains 9 and 10. The bracket 3 is provided with two posts 12 and 13 having bifurcated ends located equidistant from the center upon which the lever 7 is pivoted, so that a pin 15 carried on the outer end of the locking arm may enter the recesses 16 and 17 formed in the bifurcated ends of the posts 12 and 13.

As shown in Fig. 3. the locking arm is provided with an aperture 18 to receive the pin 15 and as said aperture 18 is of larger diameter than that of the pin the latter will be free to move in the said aperture. The pin 15 is rigidly held in the connecting rod 8 in the manner shown in Fig. 5. The pin has an annular recess 20 formed therein and the metal of the connecting rod, which is made of soft steel, is jammed into the said recess which holds the pin perfectly rigid. The pin 15 is provided with a washer 21 to prevent the head of the pin from slipping into the recess 18 in the locking arm 7. The end of the pin projects beyond the connecting rod 8 sufficiently to permit it to enter the recesses 16 and 17 in the posts 12 and 13.

The bifurcated ends of the posts 12 and 13 have projections 21 and 22 of sufficient height to make it impossible for the pin 15 to be forced out of the recess formed in the bifurcated end of the post by any pressure or force exerted through the connecting rod 8, but by means of the enlarged aperture in the locking arm 7 the pin 15 will be free to move therein sufficiently to allow the pin to ride over the projections 21 and 22 when the pin is acted on by any movement of the locking arm. Fig. 4 shows the pin 15 in the position which it assumes when entering or coming out of the slot in the end of the post.

A number of ventilators may be simultaneously operated by mounting locking arms upon a shaft extending adjacent several ventilators.

It will be understood that I do not limit my invention to the exact construction herein shown as a wheel carrying a pin and having the chain passing around the periphery of the wheel could be used in place of the lever and the locking arm without departing from my invention.

Having thus described my invention I claim and desire to secure by Letters Patent:—

1. In an operating device for ventilators or the like, the combination of a swinging panel, a pivoted member, a connecting-rod between said panel and said pivoted member, a bracket having a projection formed thereon, a pin carried by said pivoted member adapt-be engaged by said projection to lock said panel, and said pin being loosely mounted in said pivoted member so that it may be forced over said projection by the action of said pivoted member.

2. In an operating device for ventilators or the like, the combination of a swinging panel, a pivoted member, a connecting-rod, a pin forming the connection between said connecting-rod and said pivoted member, a bracket having bifurcated ends located in the arc through which said pin travels adapted to engage said pin to lock the said panel, and means for loosely mounting said pin in said pivoted member so that it may be disengaged from said bracket by the rotation of said pivoted member.

3. In an operating device for ventilators or the like, the combination of a swinging panel, a bracket, a lever pivoted in said bracket, an arm on said lever, a rod connecting said arm with said panel, said arm having an enlarged aperture formed therein, a pin loosely mounted in the said aperture formed in said arm and said bracket having posts with bifurcated ends thereon adapted to receive said pin and lock said panel.

In testimony whereof I affix my signature in presence of two witnesses.

IREDELL EACHUS.

Witnesses:
    LAWRENCE F. MCOWEN,
    M. R. CLEELAND.